US008625420B2

(12) United States Patent
Shah et al.

(10) Patent No.: US 8,625,420 B2
(45) Date of Patent: *Jan. 7, 2014

(54) SYSTEM AND METHOD FOR INCREASING GRANULARITY OF PREFIX CONTROL IN A COMPUTER NETWORK

(75) Inventors: Pritam Shah, Fremont, CA (US); Philip C. Jacobs, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/313,773

(22) Filed: Dec. 7, 2011

(65) Prior Publication Data

US 2012/0120795 A1    May 17, 2012

Related U.S. Application Data

(63) Continuation of application No. 11/337,195, filed on Jan. 20, 2006, now Pat. No. 8,098,578.

(60) Provisional application No. 60/679,184, filed on May 9, 2005.

(51) Int. Cl.
*H04L 12/26* (2006.01)

(52) U.S. Cl.
USPC ............ 370/230; 370/395.31; 370/401

(58) Field of Classification Search
USPC .............. 370/230, 389, 392, 256, 254, 401, 370/395.31
See application file for complete search history.

(56) References Cited

U.S. PATENT DOCUMENTS

| 6,725,326 | B1 | 4/2004 | Patra et al. | |
|---|---|---|---|---|
| 6,775,737 | B1 | 8/2004 | Warkhede et al. | |
| 6,917,618 | B2 | 7/2005 | Thubert et al. | |
| 6,970,971 | B1 | 11/2005 | Warkhede et al. | |
| 6,985,483 | B2* | 1/2006 | Mehrotra et al. | 370/389 |
| 8,098,578 | B1* | 1/2012 | Shah et al. | 370/230 |
| 2003/0112755 | A1* | 6/2003 | McDysan | 370/230 |
| 2003/0174717 | A1* | 9/2003 | Zabarski et al. | 370/401 |
| 2004/0013113 | A1 | 1/2004 | Singh et al. | |
| 2004/0100950 | A1* | 5/2004 | Basu et al. | 370/389 |
| 2004/0114568 | A1* | 6/2004 | Beverly | 370/351 |
| 2005/0111375 | A1* | 5/2005 | Ravindran et al. | 370/252 |

(Continued)

OTHER PUBLICATIONS

U.S. Appl. No. 60/679,184, filed May 9, 2005, entitled Systems and Methods for Use With Optimized Edge Routing, by Blair et al.

(Continued)

*Primary Examiner* — Andrew Lai
*Assistant Examiner* — Sumitra Ganguly
(74) *Attorney, Agent, or Firm* — Novak Druce Connolly Bove + Quigg LLP

(57) ABSTRACT

In one embodiment, a routing table of a router is populated with a plurality of prefixes. One or more performance characteristics of the plurality of prefixes are monitored. The router determines that a need exists to split a selected prefix of the plurality of prefixes. The router determines one or more boundaries upon which to split the selected prefix based on the monitored performance characteristics. The router then injects one or more more-specific prefixes into the routing table, each more-specific prefix referring to a smaller subset of nodes than the selected prefix, to split the selected prefix on the one or more boundaries to create a plurality of split prefixes. The split prefixes are controlled to optimize distribution of traffic.

26 Claims, 5 Drawing Sheets

(56) References Cited

U.S. PATENT DOCUMENTS

| | | | |
|---|---|---|---|
| 2005/0152332 A1* | 7/2005 | Hannum et al. | 370/351 |
| 2005/0232264 A1* | 10/2005 | Wybenga et al. | 370/389 |
| 2005/0254502 A1 | 11/2005 | Choi | |
| 2005/0257244 A1* | 11/2005 | Joly et al. | 726/1 |

OTHER PUBLICATIONS

Perlman, Radia, "Interconnections Second Edition: Bridges, Routers, Switches, and Internetworking Protocols", Sections 12.1-12.3 pp. 299-321, Addison Wesley Longman, Inc. 2000.

Rekhter, Y. et al., RFC 1771, "A Border Gateway Protocol 4 (BGP-4)", Network Working Group, Mar. 1995, pp. 1-54.

"NetFlow Services Solutions Guide", Oct. 2004, pp. 1-72, Cisco Systems, Inc.

"NetFlow v9 Export Format", Cisco IOS Release, 2003, pp. 1-22, Cisco Systems, Inc.

U.S. Appl. No. 10/980,550, filed Nov. 3, 2004, entitled Method and Apparatus for Automatically Optimizing Routing Operations at the Edge of a Network, by Shah et al.

U.S. Appl. No. 10/631,682, filed Jul. 31, 2003, entitled Cost Minimization of Services Provided by Multiple Service Providers, by Jacobs et al.

U.S. Appl. No. 11/113,629, filed Apr. 25, 2005, entitled Active Probe Path Management, by Blair et al.

U.S. Appl. No. 11/113,582, filed Apr. 25, 2005, entitled Active Probe Target Management, by Metzger et al.

U.S. Appl. No. 11/337,217, filed Jan. 20, 2006, entitled Link Policy Routing Based on Link Utilization, by Patel et al.

\* cited by examiner

| DESTINATION PREFIX 305 | EXIT (NEXT-HOP) INTERFACE 310 | NEXT-HOP ADDRESS 315 | OTHER INFORMATION 320 |
|---|---|---|---|
| P1 | EXIT 1 | BR "X" | P1 INFORMATION |
| P2 | EXIT 1 | BR "X" | P2 INFORMATION |
| P3 | EXIT 2 | BR "Y" | P3 INFORMATION |
| ... | ... | ... | ... |
| P7 | LINK A | BR 2 | P7 INFORMATION |
| ... | ... | ... | ... |
| P2a | EXIT 2 | BR "Y" | P2a INFORMATION |
| ... | ... | ... | ... |
| P4a | EXIT 2 | BR "Y" | P4a INFORMATION |
| P4b | LINK A | BR 2 | P4b INFORMATION |
| ... | ... | ... | ... |

ROUTING TABLE 300

RIB 245

ENTRIES 325

FIG. 3

SYSTEM AND METHOD FOR INCREASING GRANULARITY OF PREFIX CONTROL IN A COMPUTER NETWORK

RELATED APPLICATION

This application is a continuation of U.S. patent application Ser. No. 11/337,195, now issued as U.S. Pat. No. 8,098,578, entitled SYSTEM AND METHOD FOR INCREASING GRANULARITY OF PREFIX CONTROL IN A COMPUTER NETWORK, filed by Shah et al., on Jan. 20, 2006, the contents of which are hereby incorporated in their entirety. U.S. patent application Ser. No. 11/337,195 claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of which are hereby incorporated in their entirety.

BACKGROUND OF THE INVENTION

1. Field of the Invention

The present invention relates to computer networks and more particularly to the control and management of prefixes in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node" or "border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4* (BGP-4), published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored and/or controlled prefix) based on performance, load, cost, and service level agreements (SLAs) associated with connections to the ISP. Notably, a prefix, as defined generally herein, refers to a subset of nodes within the computer network. Ultimately, the end result for the enterprise network is improved Internet performance, better load distribution, and/or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics (e.g., for those prefixes) from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or pre-processed information exchange) between border nodes and a Master node is described in commonly owned copending U.S. patent application Ser. No. 10/980,550, now issued as U.S. Pat. No. 8,073,968, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various performance parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface is under-utilized and a second interface is oversubscribed. In this case, at least some data flows at the second interface may be redirected to the first interface. To effectuate such a routing change, the administrator (or software process) may, for example, make static changes to the routing tables at the first and second interfaces or may re-assign local-preference values (or other priority values) associated with the data flows.

The selection of an OEL or best path (e.g., for a particular prefix) is generally based on one or more policies. As defined herein, a policy is any defined rule that determines the use of resources within the network. A policy may be based on a user, a device, a subnetwork, a network, or an application. For example, a router may be configured with a policy defined to route traffic destined for a particular prefix over a best path having the shortest hop count to the prefix. Alternatively, the policy may be defined to route traffic from a type of application over a best path based on the shortest delay or round trip time (RTT). Those skilled in the art will understand that other policies may be defined, such as, e.g., reachability, lowest packet loss, best mean opinion score (MOS), which provides a numerical measure of the quality of human speech at the destination end of the circuit (e.g., for Voice over IP, or VoIP), bandwidth, utilization, etc. Also, policies may be defined to select a best exit based on cost. For example, a cost minimization policy technique is described in commonly-owned copending U.S. patent application Ser. No. 10/631,682, now issued as U.S. Pat. No. 7,257,560, entitled COST MINIMIZATION OF SERVICES PROVIDED BY MULTIPLE SERVICE PROVIDERS, filed by Jacobs et al. on Jul. 31, 2003, the contents of which are hereby incorporated in its entirety.

In addition to defining rules used to select a best path, however, policies may also be defined to govern performance characteristics for a particular prefix. Once a best path has been selected, it is important to verify that the path maintains acceptable performance characteristics, and that the current path is still, in fact, the best path. For instance, while a certain performance characteristic for a particular prefix conforms to the defined policy (i.e., over the current path), the prefix is considered to be "in-policy," and traffic remains on the current (best) path. These policies often take the form of an upper (or lower) threshold on a particular performance characteristic that should not be surpassed. For example, in the case of voice traffic (e.g., voice over IP, or VoIP), a policy may be defined indicating that the RTT should be less than 50 milliseconds (ms). If the measured RTT is, e.g., 40 ms, the prefix is considered to be in-policy. In the event, however, the performance characteristic for a particular prefix does not conform to the defined policy (e.g., 60 ms), the prefix is considered to be "out-of-policy" (OOP), and the node may be required to select an alternate path.

One example policy that may be applied to links (or paths) is a link utilization threshold policy, as described in commonly-owned copending U.S. patent application Ser. No. 11/337,217, entitled LINK POLICY ROUTING BASED ON LINK UTILIZATION, filed by Patel et al. on even date herewith, the contents of which are hereby incorporated in its entirety. A link utilization threshold policy ("link policy") may be used to define a threshold on the amount of traffic (traffic load) one or more links may carry. Also, a link policy may define a range among a plurality of links, where each of the links must maintain a traffic load that is within a certain percentage of the traffic load for the other links (e.g., for load balancing).

Generally, links are fixed, in that they have a certain capability (e.g., bandwidth, cost, delay, etc.) and connectivity (e.g., physical connection from a first node to a second node). Because of this, when a link goes OOP, one available solution is to redirect traffic traversing that OOP link onto one or more other links that are currently in-policy. Once certain traffic, e.g., to one or more prefixes, has been redirected from the OOP link, the link may become in-policy with less traffic. One problem associated with redirecting prefixes between links is that occasionally the available prefixes are larger (e.g., utilize more bandwidth) than necessary to effectively (optimally) redirect traffic from a link to bring it in-policy. For instance, 10 Kilobytes per second (KBps) of traffic may need to be redirected from a link for policy reasons, but the smallest existing prefix in the routing table may utilize 20 KBps. Redirecting the entire 20 KBps prefix may be inefficient and/or sub-optimal when only 10 KBps needs to be redirected.

In addition to policy-based reasons, system administrators may desire more granular prefix control for other purposes, as will be understood by those skilled in the art. Typically, the system administrator may manually configure smaller prefixes, but this process may be cumbersome and prone to errors. These smaller prefixes may not be configured optimally, such as based on real time traffic characteristics, but instead may be configured based on arbitrary boundaries decided by the system administrator, such as a number of nodes within the prefix. For instance, certain nodes within a prefix may generate more traffic utilization than other nodes, but those nodes may all fall within one of the smaller manually configured prefixes, thus not providing the "granular" control desired.

SUMMARY OF THE INVENTION

The present invention is directed to a technique for dynamically increasing the granularity of prefix control in a computer network. According to the novel technique, a routing table is populated with one or more reachable prefixes, e.g., learned or configured prefixes, and performance characteristics (e.g., bandwidth, cost, delay, etc.) of the prefixes are monitored. Upon determining that a need exists for more granular prefix control (i.e., smaller prefixes), one or more boundaries may be determined upon which to divide one or more of the prefixes based on the monitored characteristics and/or need. Once the one or more boundaries are determined, the one or more prefixes may be "split" accordingly, e.g., by injecting more specific prefixes into the routing table, thus providing more granular prefix control (i.e., by controlling the split prefixes).

In accordance with one aspect of the present invention, the need for granular prefix control may be determined based on a configured need or a policy-based need. A configured need may arise when there is cause (e.g., as decided by a system administrator) for monitoring and/or controlling a subset of a larger prefix, such as for optimization, applying policies, load balancing, etc. A policy-based need, on the other hand, may arise when one or more pre-defined policy-based events (e.g., out-of-policy, "OOP," events) occur that would more optimally require action on prefixes that are smaller (e.g., utilizing less total bandwidth) than existing prefixes in the routing table.

In accordance with another aspect of the present invention, boundaries may be established based on monitored characteristics of the traffic associated with existing prefixes in the routing table. A monitoring process may be configured to dynamically determine the optimal number of boundaries and their logical locations, e.g., based on the determined need. In other words, based on the monitored characteristics (e.g., bandwidth utilization or throughput for the existing prefixes), it may be determined that more specific prefixes may be apportioned from the existing prefixes to meet a particular need. Also, a user (e.g., a system administrator) may define a desired number of prefixes, for which the monitoring process may attempt to learn a corresponding number of boundaries.

In accordance with yet another aspect of the present invention, either the system administrator or a dynamic software process may split the one or more prefixes according to the established boundaries. Prefixes may be split by injecting at least one more specific prefix into the routing table, replacing the existing prefixes with at least two more specific prefixes, creating access control lists (ACLs), etc. Notably, prior to the creation and/or management of a route to a split prefix, a "parent lookup" into the routing table may be performed to ensure that the split prefix is reachable over the route (e.g., over a particular exit/link). Once the one or more split prefixes have been created, granularity of prefix control has therefore been increased. For instance, a more optimal amount of bandwidth may be redirected, different policies may be applied more specifically to smaller prefixes, smaller (split) prefixes may be routed over different links, etc.

Advantageously, the novel technique dynamically increases the granularity of prefix control in a computer network. By splitting prefixes, the novel technique provides greater control over traffic flow in the network, which allows for more optimal routing, thereby meeting many needs of policy-based routing and other administrator configured requirements. Also, by selecting prefix boundaries based on monitored characteristics, the novel technique splits prefixes according to real time traffic performance, thus providing optimal control over the traffic. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is a schematic block diagram of an exemplary routing table that may be used in accordance with the present invention;

DETAILED DESCRIPTION OF AN ILLUSTRATIVE EMBODIMENT

Figure 1:
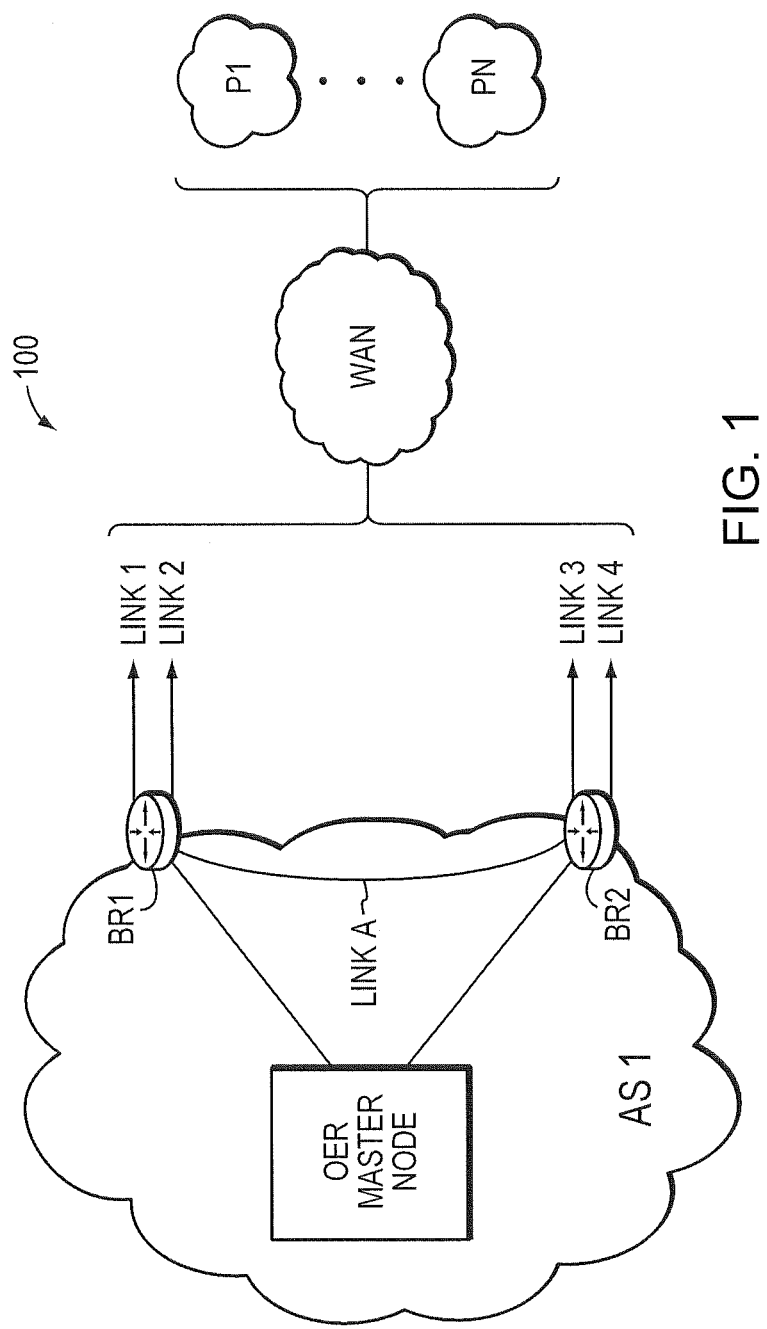
FIG. 1 is a schematic block diagram of an exemplary computer network that may be advantageously used with the present invention.

FIG. 1 is a schematic block diagram of an exemplary computer network 100 comprising an autonomous system (AS) AS1 (e.g., an enterprise or content provider network) interconnected to one or more destination prefixes P1-Pn (e.g., within one or more content consumer networks), such as, e.g., via a wide area network (WAN) (e.g., one or more ISPs). Although AS1 is illustratively an autonomous system, those skilled in the art will appreciate that AS1 may be configured as one or more routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1-BR2 permit communication from AS1 to/from destination prefixes P1-Pn (e.g., via the WAN), such as through illustrative exits (links) 1 and 2 on BR1, and exits 3 and 4 on BR2. Routing operations at the border nodes BR1-BR2 may be managed by an optimized edge routing (OER) "Master" node, which may be connected to the border nodes by, e.g., point-to-point links or a local area network. Also, BR1-BR2 may be in communication with each other, such as through illustrative links (Link A) as shown. These examples are merely representative. Those skilled in the art will understand that any number of routers, nodes, links, and exits may be used in the computer network and connected in a variety of ways, and that the view shown herein is for simplicity.

Data packets may be communicated by the AS, destination prefixes, and WAN using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among ASes using "external" gateway protocols, such as the Border Gateway Protocol (BGP).

Figure 2:
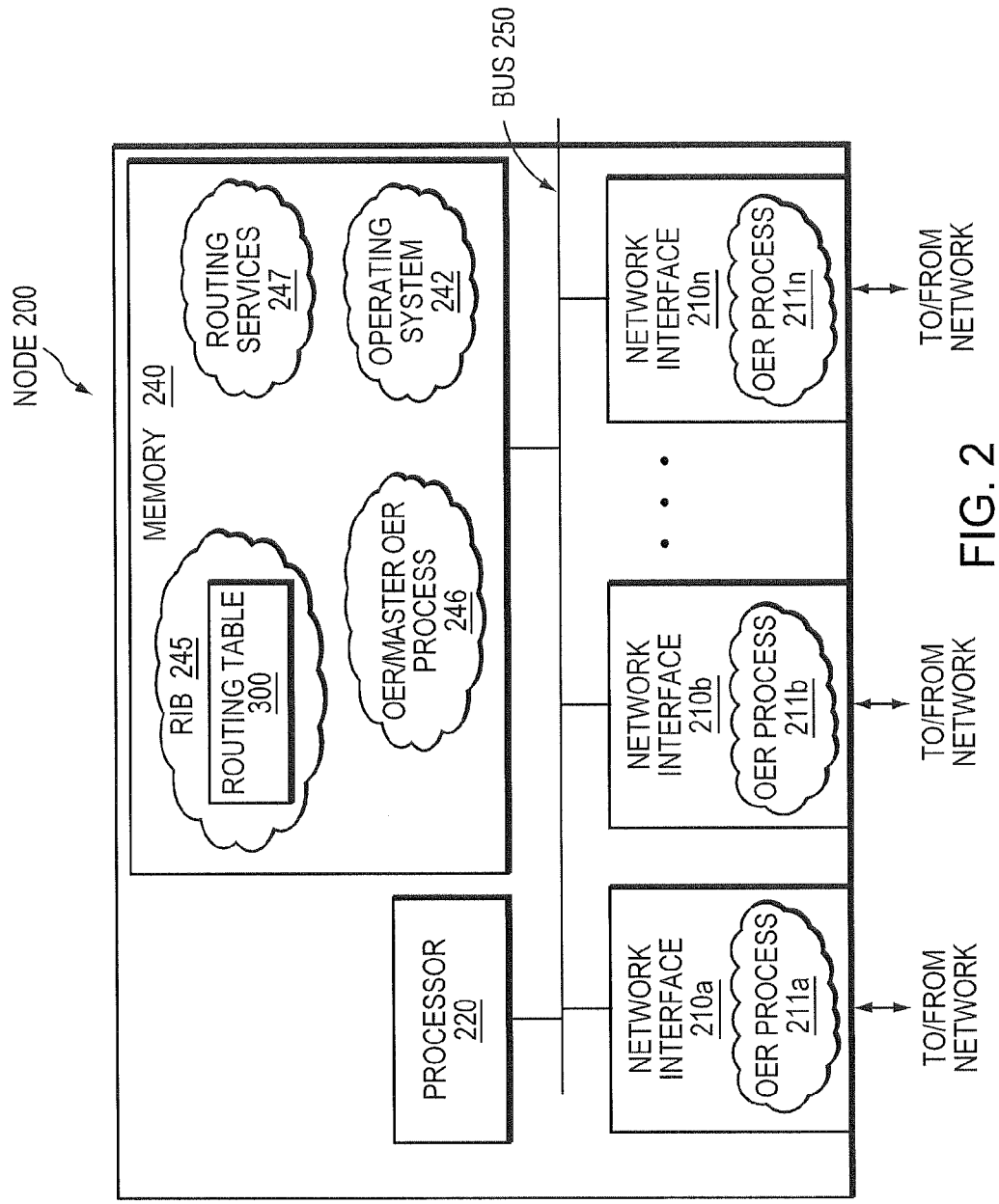
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210*a-n* (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits" or "links."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table 300, described below.

According to the illustrative embodiment of the present invention, the OER/Master OER Process 246 is employed by an OER node (e.g., border routers BR1-BR2) and an OER Master node (e.g., an OER Master router or Master Controller), respectively. The Master OER process 246 executing on the OER Master node communicates with border routers BR1-BR2 to request, among other things, the monitoring of a set of address prefixes. The OER processes 246 executing on the border routers monitor traffic at the edge of the AS 1 and respond with, inter alia, network statistics corresponding to the monitored prefixes. Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

Techniques for learning address prefixes and collecting traffic statistics (passively monitoring) are described in commonly-owned copending U.S. patent application Ser. No. 10/980,550, now issued as U.S. Pat. No. 8,073,968, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, now issued as U.S. Pat. No. 7,619,982, entitled ACTIVE PROBE PATH MANAGEMENT, filed by Blair et al. on Apr. 25, 2005, and commonly owned copending U.S. patent application Ser. No. 11/113,582, now issued as U.S. Pat. No. 7,675,861, entitled ACTIVE PROBE TARGET MANAGEMENT, filed by Metzger et al. on Apr. 25, 2005, the contents of both of which are hereby incorporated in their entirety.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 (or a configured subset of AS1) can be optimized, e.g., according to one or more policies. If so, the Master OER process may redistribute traffic routed through the border nodes by, e.g., associating new BGP local-preference values with selected traffic or statically changing the routing table contents of the border nodes, as described in detail below. In that sense, the Master OER process selects optimal exit links (OELs) ("best exits") to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for dynamically increasing the granularity of prefix control in a computer network. According to the novel technique, a routing table is populated with one or more reachable prefixes, e.g., learned or configured prefixes, and performance characteristics (e.g., bandwidth, cost, delay, etc.) of the prefixes are monitored. Upon determining that a need exists for more granular prefix control (i.e., smaller prefixes), one or more boundaries may be determined upon which to divide one or more of the prefixes based on the monitored characteristics and/or need. Once the one or more boundaries are determined, the one or more prefixes may be "split" accordingly, e.g., by injecting more specific prefixes into the routing table, thus providing more granular prefix control (i.e., by controlling the split prefixes).

FIG. 3 is a schematic block diagram of an exemplary routing table 300 that may be used in accordance with the present invention. Routing table 300 is illustratively stored in memory 240 and includes one or more entries 325, each comprising a plurality of fields for storing a reachable destination address prefix 3305 (e.g., P1-PN), an exit (next-hop) interface 310 and next-hop address 315 to reach that destination, and optionally other information 320, such as an associated metric (e.g., cost) of reaching the destination, local preference values, tags, etc. As noted, the routing table 300 is illustratively maintained and managed by RIB 245. Accordingly, RIB 245 populates the routing table 300 with learned reachable prefixes based on received advertisements (e.g., IGP, BGP, etc.), and/or with configured reachable prefixes (e.g., input by a system administrator), as will be understood by those skilled in the art.

Assume, for example, that a destination address prefix P1 is reachable from border router BR1 via exit 1 through a next-hop border router BR "X" in another AS (e.g., within the WAN). Destination address field 305 contains the reachable address P1, and the exit interface and next-hop field 310 and 315, are populated with, e.g., exit 1 and a loopback address of node BR "X", respectively. Note that a loopback address of the next-hop node may be used as the next-hop address for many reasons, including, a way to avoid depending upon the availability of network interfaces of that node. The other information field 320 may contain the cost of reaching P1, such as the cost of all links to the reachable address, or a local preference value, or a tag, etc., according to the configuration of the routing table (e.g., an IGP, BGP, or static routing table/entry), as will be understood by those skilled in the art. Other entries 325 may contain other reachable addresses and corresponding information as shown. Notably, one or more prefixes (e.g., P7) may have exits through other border routers, so their exit interfaces 310 may be an internal exit (e.g., Link A) to other border routers (e.g., BR2). Those skilled in the art will understand that routing table 300 is merely representative and is used for illustrative purposes herein, and that other tables, table configurations, or tables for other routing protocols may be used in accordance with the present invention.

As will be understood by those skilled in the art, a prefix may generally describe a subset of nodes in a computer network. For example, a mask length ("mask_length"), often denoted as "/N," is a representation of the number of most significant address bits shared by nodes within a certain address prefix. Therefore, a smaller number of shared significant bits creates a prefix (e.g., /8) that is larger than a prefix created from a larger number of shared significant bits (e.g., /24). As a simple example, assume two 32-bit address prefixes, 10.10.10.0/24, and 10.10.10.10/32. Here, the /24 prefix includes host addresses 10.10.10.1 through 10.10.10.254, sharing the same first 24 significant bits (note that 0 and 255 are special addresses), while the /32 prefix only includes host address 10.10.10.10, the only shared combination of all 32 bits. Because the /32 prefix describes a smaller subset of nodes (i.e., a node with the address 10.10.10.10) than the /24 prefix (i.e., 254 hosts), the /32 prefix is "smaller" than (i.e., is "more specific than") the /24 prefix. Also, because the address prefix 10.10.10.10/32 (i.e., node 10.10.10.10) falls within the address prefix 10.10.10.10/24 (i.e., 10.10.10.1 through 10.10.10.254), the /24 prefix is said to be a "parent prefix" for the /32 prefix.

Once the routing table 300 is populated with reachable address prefixes, the prefixes may be monitored, e.g., by OER/Master OER process 246, as described above. For example, bandwidth utilization, available bandwidth, cost, delay, loss, mean opinion score (MOS), and round trip time (RTT) for each of the prefixes may be monitored. Notably, the reachable prefixes may be configured/learned as specific prefixes or as default routes, as will be understood by those skilled in the art. Moreover, the routes for the prefixes may be IGP routes, internal BGP (iBGP) routes, external BGP (eBGP) routes, static routes, etc., as will also be understood by those skilled in the art.

In accordance with one aspect of the present invention, the need for granular prefix control may be determined based on a configured need or a policy-based need. A configured need may arise when there is cause (e.g., as decided by a system administrator) for monitoring and/or controlling a subset of a larger prefix. For instance, an administrator may wish to load balance traffic to a particular prefix over multiple available links, or perhaps may wish to have smaller prefixes, generally, such as for optimization (e.g., it may be more efficient to optimize smaller prefixes, as will be understood by those skilled in the art). Also, the administrator may wish to apply different policies to smaller prefixes for greater control. One example is where each of the smaller prefixes is routed over an exit link (e.g., possibly different exit links) based on the different policies, such as, e.g., placing higher restrictions on the prefix utilizing the most bandwidth, routing prefixes having more sensitive traffic (e.g., Voice over IP, VoIP) over exit links with more acceptable MOS values, etc. These examples of configured needs are merely representative examples, and those skilled in the art will understand that other configured needs not mentioned here may be used in accordance with the present invention.

A policy-based need, on the other hand, may arise when one or more pre-defined policy-based events (e.g., out-of-policy, "OOP," events) occur that would more optimally require action on prefixes that are smaller (e.g., utilizing less total bandwidth) than existing prefixes in the routing table. For example, in the event that 10 Kilobytes per second (KBps) of traffic needs to be redirected for policy reasons (e.g., surpassing a bandwidth utilization threshold), but the smallest existing prefix in the routing table utilizes 20 KBps, a need may exist to split that 20 KBps prefix into two separate prefixes, each at 10 KBps, so that one split prefix may be redirected accordingly. Also for example, a prefix may have become OOP based on a maximum allowable delay for a particular link. Specifically, one portion of a particular prefix may contain the offending delay values, and as such, it may be beneficial to redirect only that portion of the prefix to a more lenient link (i.e., with less strict delay policies). Other OOP events, such as, e.g., surpassing various thresholds, access restrictions, or even partial prefix reachability loss, etc., may also benefit from the ability to have smaller portions of a particular prefix upon which policy-based routing may be administered, as will be understood by those skilled in the art. These examples of policy-based needs are also merely representative examples, and those skilled in the art will also understand that other policy-based needs not mentioned here may be used in accordance with the present invention.

In accordance with another aspect of the present invention, boundaries may be established based on monitored characteristics of the traffic associated with existing prefixes in the routing table. A monitoring process (e.g., OER/Master OER process 246) may be configured to dynamically determine the optimal number of boundaries and their logical locations, e.g., based on the determined need. For instance, in the event that there is a need to redirect 10 KBps of traffic, the monitoring process may be configured to locate a more specific prefix that utilizes 10 KBps (or a plurality of more specific prefixes that total 10 KBps), and create appropriate boundaries for the more specific prefix(es). The boundary (or boundaries for multiple prefixes) and logical location of the located 10 KBps traffic defines the smaller prefix(es) that may be more optimally controlled, as described herein. In other words, based on the throughput to the existing prefixes (i.e., their bandwidth utilization), it may be determined that more specific prefixes may be apportioned from the existing prefixes to meet a particular need. For example, a prefix may exist in the routing table 300, e.g., P2, that is 20.20.0.0/16 (either learned or configured). By monitoring the traffic to this prefix (e.g., by OER process 246), it is determined that 20 KBps of traffic throughput (bandwidth) flow to the prefix, 10 KBps of which flow to a small subset of the prefix, e.g., to addresses from 20.20.20.1 through 20.20.20.254. A smaller prefix (with 10 KBps of traffic) may therefore be apportioned accordingly upon the prefix boundary and location corresponding to 20.20.20.0/24.

Another, more general need is the need to efficiently optimize traffic. Assume, for example, that a prefix exists in the routing table 300, e.g., P3, that is 10.10.0.0/16. During the monitoring of traffic, the monitoring process learns of distinct traffic flows to 10.10.1.1, 10.10.2.1, and 10.10.3.1. From these three traffic flows, then, the monitoring process may determine that three separate and more specific prefixes may be formed, whose logical locations may be 10.10.1.0/24, 10.10.2.0/24, and 10.10.3.0/24, respectively. In this way, boundaries for smaller prefixes may be formed based on detected real-time traffic characteristics in the computer network, and, as those skilled in the art will appreciate, the smaller prefixes formed in this way afford greater control over specific traffic flows, i.e., traffic flowing to each of the more specific prefixes once they are split, as described below. Note that the remaining addresses not contained within one of the three more specific prefixes continue to be referenced by the parent prefix, 10.10.0.0/16 (i.e., host addresses 10.10.4.1-10.10.254.254).

Also, a user (e.g., a system administrator) may define a desired number of prefixes, for which the monitoring process may attempt to learn a corresponding number of boundaries. For example, the system administrator may wish to load balance traffic to a particular prefix across a known number of exit links from the network (e.g., Links 1-4 in AS1). Alternatively, the administrator may simply desire to have a certain number of smaller prefixes for greater control. In either of these cases, the monitoring process (e.g., OER process 246) may attempt to learn that configured number of smaller prefixes. Notably, the resultant boundaries and locations of the smaller prefixes may be based on a desired need, as well. For instance, for load balancing, substantially equal bandwidth utilization prefixes may be desired, while other needs (e.g., distributing the top delay offenders) may result in other prefix divisions. Those skilled in the art will understand that the above examples for boundaries and reasons for the boundaries (both based on monitored characteristics and user configuration) are merely representative, and that other boundary reasons and/or configurations are possible in accordance with the present invention.

In accordance with yet another aspect of the present invention, either the system administrator or a dynamic software process (e.g., OER/Master OER process 246) may split the one or more prefixes according to the established boundaries. Illustratively, prefixes may be split by injecting at least one more specific prefix into the routing table. For instance, refer again to prefix P2 from above, which is 20.20.0.0/16, and assume that the learned boundary for a desired 10 KBps of traffic falls at 20.20.20.0/24. By injecting the smaller, more specific prefix 20.20.20.0/24 (P2a, within a dashed box) into the routing table 300, the more specific prefix is preferred for traffic to any node within that prefix than the less specific parent prefix P2, as will be understood by those skilled in the art. This injection essentially "splits" the prefix P2 into two parts, namely, into 20.20.20.0/24 (P2a) and the remaining addresses in 20.20.0.0/16 (P2) not included in P2a (e.g., host addresses 20.20.1.1-20.20.19.254, and 20.20.21.1-20.20.254.254). Accordingly, any traffic to a destination with addresses 20.20.20.1-20.20.20.254 (i.e., P2a) may be routed over a different path and controlled independently from the parent prefix (P2).

Alternatively, prefixes may be split by replacing an existing prefix with at least two more specific prefixes in the routing table 300. For example, assume that a prefix P4 exists in the routing table 300 (not shown) that is 30.30.30.0/24. Further assume that for a reason described above, the prefix P4 is to be split on a single boundary that divides the prefix in half, e.g., to /25. Rather than simply inserting one more specific prefix as above, the alternative method would remove the original prefix P4, and subsequently replace it with two more specific prefixes, namely, 30.30.30.0/25 (P4a) and 30.30.30.128/25 (P4b). Notably, those skilled in the art will understand that the more specific prefixes should (e.g., must) cover substantially the same scope as the original existing prefix (P4), otherwise routing information to certain addresses may be lost from routing table 300. Those skilled in the art will also understand that there may be reasons (e.g., network stability, default routing preferences, parent prefix control, etc.) that prohibit the replacement of an original existing prefix with at least two more specific prefixes.

Other methods for splitting prefixes that will be understood by those skilled in the art may be used in accordance with the present invention, and the above examples are merely representative. For instance, access control lists (ACLs) may be created for certain potions of a parent prefix, assignments may be made to groups of nodes within a prefix (e.g., virtual private networks, VPNs), etc.

Notably, prior to the creation and/or management of a route to a split prefix, a "parent lookup" operation into the routing may be performed to ensure that the split prefix is reachable over the route (e.g., over a particular exit/link). The parent lookup checks whether a parent prefix (and, consequently, a more specific split prefix) is currently reachable via a selected route in routing table 300. For instance, if P2 is reachable via both exits 1 and 2, then split prefix P2a is also reachable via both exits 1 and 2. If the split prefix does have a parent prefix reachable via the selected route, the split prefix may be created/managed accordingly. Otherwise, such as in the case where P2 is not reachable via exit 2 and the attempted route for the split prefix P2a is via exit 2, an error may be returned to the Master Controller (e.g., Master OER Process 246), e.g., to update the route (best exit) selection or for investigation by a system administrator.

Once one or more split prefixes have been created, the granularity of prefix control will therefore be increased. For instance, a more optimal amount of bandwidth may be redirected, different policies may be applied more specifically to smaller prefixes, smaller (split) prefixes may be routed over different links, etc. Those skilled in the art will understand that the split prefixes may be controlled (e.g., managed, optimized, advertised, redirected, etc.) in the same manner as conventional prefixes, in that they are conventional prefixes, but optimally created (split) in response to monitored characteristics and/or need for greater control. For example, refer to the case described above with reference to prefix P2. Originally, P2 utilized 20 KBps of bandwidth on a link, which for some reason (e.g., surpassing a link utilization threshold) was OOP by 10 KBps. Since P2 in this example was the smallest prefix available on the link, P2 may now be split into P2a with 10 KBps and the remaining 10 KBps on P2 in accordance with the present invention. With the two 10 KBps prefixes, either one may be optimally redirected to another in-policy link accordingly.

Figure 4:
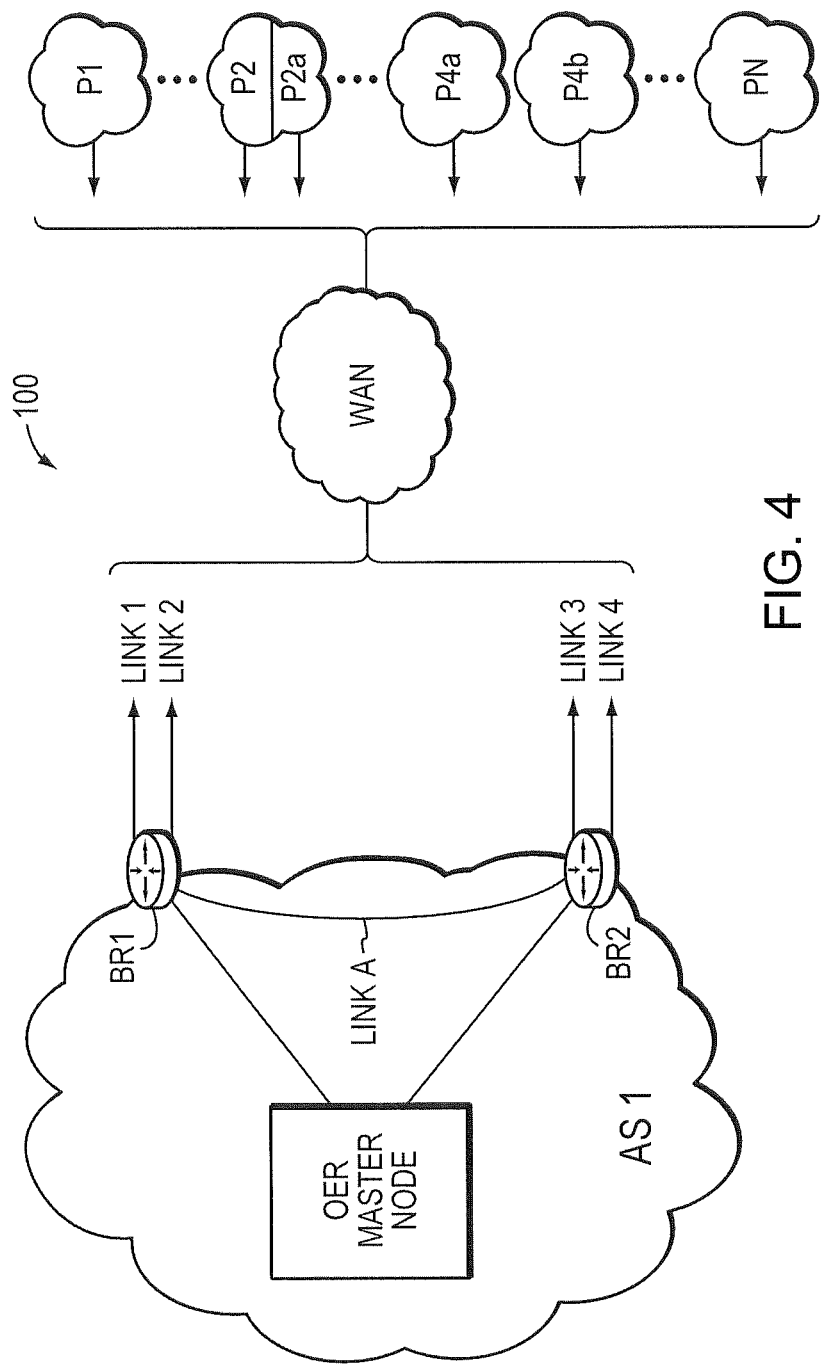
FIG. 4 is a schematic block diagram of the network in FIG. 1 with split prefixes in accordance with the present invention.

Briefly, FIG. 4 is a schematic block diagram of the network 100 in FIG. 1 with split prefixes in accordance with the present invention. For example, parent prefix P2 discussed above has been split into P2 and P2a. Illustratively, P2a is shown as part of P2 because P2a is a more specific prefix than P2, but is still included within the scope of parent prefix P2. Also, P4a and P4b are shown as separate split prefixes because, as discussed above, they replaced their parent prefix P4 (not shown). Other split prefixes in other configurations may be possible, and as those skilled in the art will understand, the representations in FIG. 4 are merely representative.

Notably, routing information for the one or more split prefixes may be distributed from the node splitting the prefix (e.g., a BR or Master controller) into the surrounding network (AS1). Illustratively, the scope of distribution may be limited to within the local network (AS1), such as, e.g., for security and/or competitive purposes. However, those skilled in the art will understand that the distribution of routing information for the split prefixes may not be limited to the local network, and may be distributed to external networks (e.g., across the WAN) for other networks. The distribution may utilize any conventional protocols, such as IGP or BGP advertisements, or may utilize specific-use protocols, such as, e.g., a protocol used to communicate between OER nodes and an OER Master controller.

Figure 5:
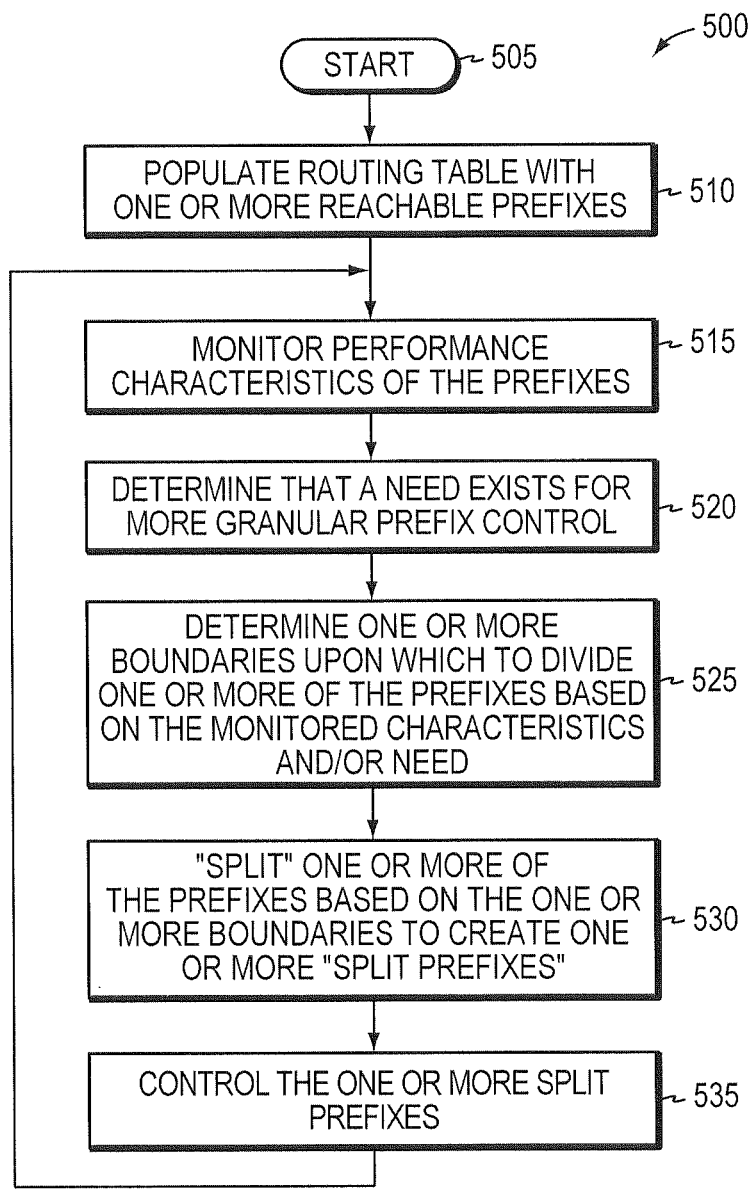
FIG. 5 is a flowchart illustrating a procedure for dynamically increasing the granularity of prefix control in accordance with the present invention.

FIG. 5 is a flowchart illustrating a procedure for dynamically increasing the granularity of prefix control in accordance with the present invention. The procedure 500 starts at step 505, and continues to step 510, where a routing table (e.g., routing table 300) is populated with one or more address prefixes, such as by configuration or learning, as described above. As step 515, a monitoring process, such as OER/Master OER process 246, monitors the performance characteristics of the prefixes. If a need exists for a more granular prefix control in step 520, one or more boundaries upon which to divide one or more of the prefixes are determined based on the monitored characteristics and/or need in step 525. Once the one or more boundaries are determined, one or more prefixes may be split in step 530 according to the boundaries to create one or more split prefixes, as described above. The split prefixes may then be controlled in step 535, thus providing greater prefix control, i.e., control of dynamically created smaller prefixes on optimally determined boundaries. The procedure may then either end, or return to step 515 to continue monitoring performance characteristics for when another need arises in step 520.

Advantageously, the novel technique dynamically increases the granularity of prefix control in a computer network. By splitting prefixes, the novel technique provides greater control over traffic flow in the network, which allows for more optimal routing, thereby meeting many needs of policy-based routing and other administrator configured requirements. Also, by selecting prefix boundaries based on monitored characteristics, the novel technique splits prefixes according to real time traffic performance, thus providing optimal control over the traffic. Further, the dynamic nature of the novel technique alleviates the need for cumbersome manual configuration.

While there has been shown and described an illustrative embodiment that dynamically increases the granularity of prefix control in a computer network, it is to be understood that various other adaptations and modifications may be made within the spirit and scope of the present invention. For example, the invention has been shown and described herein for use with OER processes. However, the invention in its broader sense is not so limited, and may, in fact, be used with other route optimization processes known to those skilled in the art. Also, while the invention has been shown and described using representative IPv4 32-bit addresses, the invention may, in fact, be used with IPv6 128-bit addresses, or other address formats, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
  populating a routing table of a router with a plurality of prefixes;
  monitoring one or more performance characteristics of the plurality of prefixes in the routing table;
  determining, by the router, that a need exists to split a selected prefix of the plurality of prefixes;
  determining one or more boundaries upon which to split the selected prefix based on the monitored one or more performance characteristics;
  injecting one or more more-specific prefixes into the routing table, each more-specific prefix referring to a smaller subset of nodes within a computer network than the selected prefix, the one or more more-specific prefixes chosen to split the selected prefix on the one or more boundaries to create a plurality of split prefixes; and
  controlling the split prefixes to optimize distribution of traffic in the computer network.

2. The method of claim 1, wherein the need is based on a desire to load balance traffic associated with the selected prefix over a plurality of links in the computer network.

3. The method of claim 1, wherein the need is based on a desire to route different portions of the selected prefix based on different policies.

4. The method of claim 1, wherein the need is based on one portion of the selected prefix becoming out of policy (OOP) for a particular policy, while one or more other portions of the selected prefix are still in policy for the particular policy.

5. The method of claim 1, wherein the determining one or more boundaries determines a number of boundaries based upon the need.

6. The method of claim 1, wherein the one or more more-specific prefixes are a plurality of more-specific prefixes, and the injecting further comprises:
  removing the selected prefix from the routing table.

7. The method of claim 1, wherein the one or more more-specific prefixes are preferred over the selected prefix, and the injecting further comprises:
  maintaining the selected prefix in the routing table for use by traffic that is not associated with any of the one or more more-specific prefixes.

8. The method of claim 1, wherein the controlling further comprises:
  advertising the plurality of split prefixes to one or more other nodes in the computer network.

9. The method of claim 1, wherein the one or more performance characteristics comprise delay.

10. The method of claim 1, wherein the one or more performance characteristics comprise bandwidth utilization or availability.

11. The method of claim 1, further comprising:
  performing a parent lookup operation prior to injecting the one or more more-specific prefixes into the routing table.

12. An apparatus comprising:
  one or more network interfaces;
  a processor coupled to the one or more network interfaces and configured to execute one or more software processes; and
  a memory configured to store a routing table and an optimized edge routing (OER) process executable by the processor, the OER process when executed operable to:
    monitor one or more performance characteristics of a plurality of prefixes maintained in the routing table and accessible over the one or more network interfaces;

determine one or more boundaries upon which to split a selected prefix based on the monitored one or more performance characteristics;

inject one or more more-specific prefixes into the routing table, each more-specific prefix to refer to a smaller subset of nodes within a computer network than the selected prefix, the one or more more-specific prefixes chosen to split the selected prefix on the one or more boundaries to create a plurality of split prefixes; and control the split prefixes to optimize distribution of traffic in the computer network.

13. The apparatus of claim 12, wherein the OER process when executed is further operable to:

determine that a need exists to split a selected prefix of the plurality of prefixes, the need based on a desire to load balance traffic associated with the selected prefix over a plurality of links in the computer network.

14. The apparatus of claim 12, wherein the OER process when executed is further operable to:

determine that a need exists to split a selected prefix of the plurality of prefixes, the need based on one portion of the selected prefix becoming out of policy (OOP) for a particular policy while one or more other portions of the selected prefix are still in policy for the particular policy.

15. The apparatus of claim 12, wherein the one or more more-specific prefixes are a plurality of more-specific prefixes, and wherein the OER process when executed is further operable to:

remove the selected prefix from the routing table in connection with the injection of the one or more more-specific prefixes into the routing table.

16. The apparatus of claim 12, wherein the OER process when executed is further operable to:

in connection with the injection of the one or more more-specific prefixes into the routing table, maintain the selected prefix in the routing table for use by traffic that is not associated with any of the one or more more-specific prefixes.

17. The apparatus of claim 12, wherein the OER process when executed is further operable to:

advertise the plurality of split prefixes to one or more other nodes in the computer network.

18. Software stored on one or more non-transitory computer readable media, the software when executed operable to:

monitor one or more performance characteristics of a plurality of prefixes maintained in a routing table;

determine that a need exists to split a selected prefix of the plurality of prefixes;

determine one or more boundaries upon which to split the selected prefix based on the monitored one or more performance characteristics;

inject one or more more-specific prefixes into the routing table, each more-specific prefix referring to a smaller subset of nodes than the selected prefix, the one or more more-specific prefixes chosen to split the selected prefix on the one or more boundaries to create a plurality of split prefixes; and control the split prefixes to optimize distribution of traffic.

19. The software stored on one or more non-transitory computer readable media of claim 18, wherein the one or more more-specific prefixes are a plurality of more-specific prefixes, and the software operable to inject the one or more more-specific prefixes into the routing table is further operable to remove the selected prefix from the routing table.

20. The software stored on one or more non-transitory computer readable media of claim 18, wherein the software operable to inject the one or more more-specific prefixes into the routing table is further operable to maintain the selected prefix in the routing table for use by traffic that is not associated with any of the one or more more-specific prefixes.

21. A method comprising:

populating a routing table of a router with a plurality of prefixes;

monitoring one or more performance characteristics of the plurality of prefixes in the routing table;

determining, by the router, that a need exists to split a selected prefix of the plurality of prefixes;

determining, by the router, one or more boundaries upon which to split the selected prefix based on the monitored one or more performance characteristics; and splitting the selected prefix on the one or more boundaries to create a plurality of split prefixes.

22. The method of claim 21, wherein the one or more more-specific prefixes are a plurality of more-specific prefixes, and the splitting further comprises:

injecting the one or more more-specific prefixes into the routing table.

23. The method of claim 22, wherein the injecting further comprises:

removing the selected prefix from the routing table.

24. The method of claim 22, wherein the one or more more-specific prefixes are preferred over the selected prefix, and the injecting further comprises:

maintaining the selected prefix in the routing table.

25. The method of claim 21, further comprising:

advertising the plurality of split prefixes to one or more other nodes in the computer network.

26. The method of claim 21, further comprising:

performing a parent lookup operation prior to injecting the one or more more-specific prefixes into the routing table.

* * * * *